United States Patent Office 3,590,126
Patented June 29, 1971

3,590,126
CHITIN ANTIGENS AND METHOD
William R. Porter, 301 Piping Rock Drive,
Colesville, Md.
Filed Apr. 2, 1968, Ser. No. 718,188
Int. Cl. A61k *23/02*
U.S. Cl. 424—88
10 Claims

ABSTRACT OF THE DISCLOSURE

The present invention provides chitin antigens and use thereof for treating warm-blooded animals normally subject to attack by parasitic members of the class Arachnida, typically ticks and mites.

---

The present invention relates to antigens comprising chitin, and more particularly to a method of treating warm-blooded animals normally subject to attack by parasitic members such as those of the class Arachnida by administration of such antigens. A precursor composition comprising chitin of the present invention may be administered by injection into a warm-blooded animal for the therapeutic purpose of freeing the animal from infestation of parasitic members, and for the prophylactic purpose of immunizing the animal against further attack of the parasitic members.

Many warm-blooded animals are subject to attack by parasites such as those of the order Arthropoda and particularly those of the class of Arachnida, such as ticks, mites and the like.

Animal parasites as well as bacteria and viruses contain antigenic substances. Investigators in the art have heretofore attempted to immunize warm-blooded animals against various parasitic bodies by administration of compositions containing dried insects to take advantage of useful antigens which may be present therein. These compositions have been generally ineffective, probably due to the fact that the dried insects contain many chemical complexes in addition to the useful antigens, which complexes interfere with immunization activity of any single antigenic component. It has now been found that isolation of the material chitin from various sources including certain dried insects is highly effective as an antigen when administered to warm-blooded animals.

The present antigenetrically-active compositions not only have been found to free animals of parasitic organisms when infested, but also have been found to immunize animals against further attack of such parasitic organisms. Thus, the present compositions have both therapeutic and prophylactic uses.

Although antigenic compositions contain chitin as a principal active ingredient and are effective in warm-blooded animals subject to attack by parasitic members of the class Arachnida, such as mites and ticks or the like, the present compositions may also prove effective against certain bacteria and fungi containing chitin as well as other such parasitic organisms containing chitin and dependent for existence on warm-blooded animals.

According to the present invention, it has been found that the organic chemical compound chitin is effective as an antigen when administered to warm-blooded animals. The Merck Index, Fifth Edition at p. 135, defines chitin by the empirical formula $C_{30}H_{50}O_{19}N_7$ with a molecular weight of 770.42. Chitin is described to be an amorphous, horny, polysaccharide substance derived from carapaces of crabs and beetles. This material is also found in fungi, bacteria and the like. Physically, chitin is a white, amorphous, semi-transparent material; and chemically it is insoluble in ordinary solvents, oils, dilute acids, and alkali, although it is soluble in concentrated mineral acids such as hydrochloric acid, nitric acid and sulfuric acid.

Chitin has been described in the literature as a hexosamine which yields, on hydrolysis, an amino hexose called chitosamine. For this reason, chitin may be generally classified as a polysaccharide substance which closely relates to materials used in studies of immunity-producing compositions, especially those used for antigenic properties.

Chitin naturally occurs in the physiology of insects and is of generical origin in all insects having an exo-skeleton where chitin composes the innermost layer of the exo-skeleton known as the endo-cuticle. Chitin is also present as a lining in the intestinal tract of insects and is contiguous with flat, hard, horny coverings over the outer body surfaces.

In insects that eat solid food, there may be found a midgut generally protected by a delicate detached membrane of chitin i.e. the peritrophic membrane, through which osmosis occurs. Chitinous excreting cells have also been recognized to exist in a specialized form in mouth parts, respiratory parts and in the digestive process areas of insects.

In the preferred practice of the present invention, chitin may be administered to warm-blooded animals by injection in finely-ground solid form of sufficient fineness to pass through the bore of a hypodermic needle. Desirably, a suitable carrier is included with the chitin which carrier absorbs the chitin. Suitable solid carriers in finely-powdered form include materials such as kaolin and hydrous alumina such as aluminum hydroxide. These latter materials may also be used to enhance antibody producing powers of the antigen chitin. Chitin, either alone or in combination with a suitable solid carrier, may be added to a suitable liquid carrier such as physiological saline solutions and the mixture may be sterilized according to standard pharmacopea procedures employed for parenteral injectibles.

When the chitin of the present invention is compounded for administration as an injectible, it may be added in an amount from about one-half to about 10 grams and preferably from about 1 to about 5 grams per 100 cubic centimeters of liquid carrier. A typical injection of such a preparation is about 1 cubic centimeter per 1 to about 10 pounds of animal and preferably about 1 cubic centimeter per 5.5 pounds of animal. The inclusion of solid carriers in finely-powdered form may be in similar proportion to the chitin addition, usually adjusted in proportion to activate and accelerate the chitin activity as an antigen in the animal. Typically, the solid powdered carrier is present in an amount of about one-half to about 5 grams in 100 cc. of saline solution.

The saline solution carrier may contain from about 1½% to about 3% by weight of sodium chloride salt disposed in deionized or distilled water.

The following examples are included to further illustrate the practice of the present invention.

EXAMPLE I

Chitin was ground to fine particle size capable of passing through the bore or lumen of a 16 ga. hypodermic needle. Two and one-half grams of ground chitin were combined with one gram of ground kaolin and one gram of aluminum hydroxide gel. To this chitin preparation was added a sufficient quantity of physiological saline solution containing about 2.2% by weight of sodium chloride to equal 100 cubic centimeters of preparation. This preparation was then placed in a stoppered bottle and sterilized according to the standard U.S. Pharm. method for materials administered by injection.

EXAMPLE II

A Doberman Pinscher hound weighing fifty-five pounds was given a subcutaneous injection of 10 cc. of the composition prepared in Example I. This animal was naturally infested with brown dog ticks over its body and inner ear areas. A noticeable swelling appeared at the injection site after injection but the swelling gradually disappeared and resorbed over a ten-day period. Upon examination five days after resorption, a total of fifteen days from the initial injection, it was found that all ticks had left the neck, thorax and abdomen areas. The inner ear area, however, was still heavily infested with small ticks.

A second injection of the composition of Example I consisting of 5 cc. was then given intramuscularly fifteen days after the initial injection. Beginning twenty-five days after the first injection the dog was examined each day for a period of two and one-half months. It was found, without further treatment than described above, that the dog was entirely tick free in all areas. Moreover, the hair coat of the dog was found to be immensely improved, indicating that the administered chitin exhibited antigenic activity against bacteria and fungi-containing chitin. No adverse effects were noticed and the dog was allowed freedom on a farm of some two hundred acres. The dog showed no renewed attack by ticks when re-examined after being freed.

EXAMPLE III

A slightly tick infested three year old male Beagle dog weighing thirty pounds was injected subcutaneously with 5 cc. of the composition prepared in Example I. Reexamination of this dog nine days later revealed the presence of one female tick which was in the process of abortion on the dog. Female ticks of this infested species are known to invariably lay eggs on a sheltered spot. No adverse effects to the dog were noticed as a result of the injection. The hair coat of the dog improved even though the dog was allowed complete freedom on a two hundred acre farm. When re-examined about three months after injection, the dog was found to remain tick free.

EXAMPLE IV

A male English Setter weighing 45 pounds was injected subcutaneously with 10 cc. of the composition prepared as described in Example I. No ticks were noted on the animal at the time of injection. The dog was allowed bi-weekly exercise on a 200 acre farm. Examination nine days after injection and weekly thereafter for three months revealed that the hair coat had improved and that the dog remained tick free.

EXAMPLE V

A male English Setter weighing 38 pounds was injected intramuscularly with 5 cc. of the composition described in Example I. A few ticks were noted on the animal at the time of injection. Examination of the animal nine days later showed no adverse effects of the injection, that the hair coat had improved, and that the dog was tick free. The dog was allowed bi-weekly exercise on a farm and re-examination found no ticks.

EXAMPLE VI

A mixed breed male dog weighing 35 pounds was injected with 10 cc. of the composition described in Example I. A noticeable swelling appeared at the site of the injection which resorbed within nine days. A very distinct improvement in the dog's hair coat was observed at this time. The dog was allowed to roam freely and had remained tick free when re-examined about two months after injection.

EXAMPLE VII

Four dogs as described in Table I were injected and were allowed freedom each day at twilight and were confined the next morning. All of the dogs remained tick free while other dogs in the same geographical area that were not chitin innoculated were infested with ticks to various degrees. The injected dogs showed improvement in hair coat with no adverse effects of injection being noticed.

TABLE I

| Breed | Weight of animal (lbs.) | Antigen of Example I | Sex and age of animal | Reaction to injection |
|---|---|---|---|---|
| Hound | 25 | 5 | Male 3 yrs. old | Satisfactory. |
| Do | 30 | 5 | Female, 5 yrs. old | Do. |
| Bulldog | 65 | 10 | Male, 18 mos. old | Do. |
| Do | 60 | 10 | do | Do. |

EXAMPLE VIII

Prior to injection the animals described in Examples II and III were bled and 10 cc. of whole blood were taken from each animal. Three cubic centimeters of blood serum was recovered from each sample and lettered A and B. One cubic centimeter of the serum A was placed in each of three test tubes marked IA, IIA, IIIA; and one cubic centimeter of serum B was placed in each of three test tubes marked IB, IIB and IIIB. In each of tubes IA, IIA and IIIA was placed 5 mg. of the antigen chitin. The tubes were incubated at a temperature of 65 to 67° F. In forty-eight hours a precipitate had formed around the antigen of each sample. A dried female tick was ground to powder and 1 gram thereof was suspended in one cubic centimeter of physiological saline solution. One tenth of this cubic centimeter was then dripped into tubes marked IB, IIB and IIIB. Each of the B tubes was then incubated at a temperature of 65° to 67° F. A visible tenacious precipitate formed which incorporated the powdered tick substance when observed by microscopic examination. This effect was pronounced in the B marked samples.

A set of test tubes marked IC, IIC and IIIC; and ID, IID and IIID, containing only serum from the dogs of Examples II and III respectively to which no chitin was added were similarly processed as corresponding serum containing test tubes of the A and B series. No precipitate was formed in the C and D series test tubes. This example shows that a clear antibody response in serum containing chitin exists.

EXAMPLE IX

Three live ticks, two females which were semi-engorged, and one male, were placed in an aerobic petri dish. Sufficient whole blood was taken from the chitin injected dog of Example II and was added to form a thin film on the bottom of the dish, allowing certain dry areas. Observation of these ticks showed that they became visibly affected in two hours. One female tick aborted nine eggs after five hours. After five hours the three ticks were comatose and remained so for twenty-four hours. At that time they were refed with new blood containing chitin of the injected dog of Example II and again became comatose.

EXAMPLE X

The experiment of Example IX was repeated except that three fleas were substituted for the ticks described above and blood containing chitin from the dog of Example III was used. All of the fleas were dead within twenty-two hours.

EXAMPLE XI

A male tick was placed in an aerobic petri dish with serum taken from the chitin-injected dog of Example III. The tick became comatose in four hours and the nervous system of the tick appeared to be affected. The tick did not expire since it is well known from numerous studies of the tick that they have extremely great longevity in nature.

The above experiments indicate clearly the physiological interference of the antibody chitin on parasitic members such as those of the class Arachnida.

It is recognized that although chitin of the present invention may be administered alone or in combination with other materials such as antibiotics or the like added in amounts for their known activities, the present invention has wider implications principally because the whole class of Arthropodae are well known vectors and transmitters of many diseases occurring in organisms. Consequently, the development of an antigen capable of destroying or retarding attack of these parasites is a protective antigen for the several diseases which ticks and related Arachnida as a class are known to transmit.

As thus described, warm-blooded animals subject to attack by Arthropodae parasitic members and in particular to Arachnida members may be injected with chitin to develop antibodies in the animal capable of retarding parasitic attack. It has further been found that blood and particularly the serum of warm-blooded animals containing such antibodies developed by chitin may be a useful injectible to immunize other warm-blooded animals against parasitic attack and the associated diseases which they may transmit.

Consequently, modifications within the scope of this invention will occur to workers in these fields. Substantial modifications are possible in the carrier material since any physiological or pharmacologically-acceptable carrier may be substituted for those disclosed herein. The dosage defined herein may be varied to suit the particular animal to be injected, as based, for example, on the degree of infestation by parasitic members.

Various modifications will occur to those skilled in the art and, accordingly, it is intended that the specification and examples be regarded as illustrative except as defined in the claims appended hereto.

I claim:
1. An immunizing parenteral injectible for rendering infected dogs tick-free and improving their hair coat comprising chitin ground to fine particle size capable of passing through the bore or lumen of a hypodermic needle distributed in small quantity in a pharmacologically acceptable carrier liquid in quantity of about 1 to 10 grams of powdered chitin, and the balance to 100 cc. being the carrier liquid.

2. The immunizing injectible of claim 1 wherein said quantity of chitin and a small quantity of a solid carrier is disposed in a physiologically saline solution as said carrier liquid.

3. The composition as defined in claim 2 wherein the carrier comprises a small quantity of kaolin.

4. The composition as defined in claim 2 wherein the carrier comprises a small quantity of hydrous alumina.

5. The composition as defined in claim 2 wherein the injectible composition comprises about 1 to 5 grams of said powdered chitin, about ½ to about 5 grams of kaolin, and about ½ to about 5 grams of aluminum hydroxide gel, and the balance up to 100 cc. is a physiological saline solution.

6. The method of immunizing and curing dogs infected with ticks, fleas or other Arachnida parasitic members comprising parenterally injecting into the body of the dog to be treated a small quantity of chitin ground to fine particle size capable of passing through the bore or lumen of a hypodermic needle distributed in small quantity in a pharmacologically acceptable carrier liquid in quantity of about 1 to 10 grams of powdered chitin, and the balance to 100 cc. being the carrier liquid.

7. A dog blood serum protective against Arachnida parasitic attack which comprises separated blood of a dog injected with chitin ground to fine particle size capable of passing through the bore or lumen of a hypodermic needle distributed in small quantity in a pharmocologically acceptable carrier liquid in quantity of about 1 to 10 grams of powdered chitin, and the balance to 100 cc. being the carrier liquid.

8. A prophylactic for administration to dogs subject to attack by chitin-containing parasitic members which comprises as an active antigen the compound chitin ground to fine particle size capable of passing through the bore or lumen of a hypodermic needle distributed in small quantity in a pharmacologically acceptable carrier liquid in quantity of about 1 to 10 grams of powdered chitin, and the balance to 100 cc. being the carrier liquid.

9. The prophylactic of claim 6 wherein the chitin is disposed in a liquid carrier comprising a saline solution for administration by injection.

10. An immunizing parenteral injectible for rendering infected dogs tick-free and improving their hair coat comprising chitin ground to fine particle size capable of passing through the bore or lumen of a hypodermic needle combined with ground kaolin and aluminum hydroxide gel as a dry carrier enhancing the antibody producing powers of the chitin antigen, distributed in small quantity in a pharmaceutically acceptable injectible physiologically saline carrier.

References Cited
UNITED STATES PATENTS

| | | | |
|---|---|---|---|
| 2,755,275 | 7/1956 | Cushing et al. | 260—211 |
| 2,783,148 | 2/1957 | Gyorgy et al. | 260—211X |
| 2,832,766 | 4/1958 | Wolfrom | 260—211 |
| 2,952,585 | 9/1960 | Heller | 424—88X |
| 3,148,121 | 9/1964 | Strauss | 424—91X |

SHEP K. ROSE, Primary Examiner

U.S. Cl. X.R.

424—85